United States Patent
Furuta

(10) Patent No.: US 6,732,823 B2
(45) Date of Patent: May 11, 2004

(54) ELECTRIC ONE-BAG GOLF CART

(75) Inventor: Yasuhiro Furuta, Tokyo (JP)

(73) Assignee: Billcon Corporation, Tokyo (JP)

( * ) Notice: Subject to any disclaimer, the term of this patent is extended or adjusted under 35 U.S.C. 154(b) by 0 days.

(21) Appl. No.: 10/342,278

(22) Filed: Jan. 13, 2003

(65) Prior Publication Data

US 2003/0159864 A1 Aug. 28, 2003

(51) Int. Cl.⁷ .............................................. B25D 5/104
(52) U.S. Cl. ..................... 180/19.2; 180/19.3; 180/216; 280/DIG. 5
(58) Field of Search ................... 280/DIG. 5; 180/19.1, 180/19.2, 19.3, 6.24, 210, 215, 216

(56) References Cited

U.S. PATENT DOCUMENTS

| | | | | |
|---|---|---|---|---|
| 2,706,008 A | * | 4/1955 | Voigt | 180/19.2 |
| 3,907,056 A | * | 9/1975 | Thomas III | 180/19.1 |
| 4,356,875 A | * | 11/1982 | Clune | 180/13 |
| 4,418,776 A | * | 12/1983 | Weirick | 180/19.3 |
| 4,615,406 A | * | 10/1986 | Bottenschein et al. | 180/19.1 |
| 4,657,100 A | * | 4/1987 | Lewis | 180/19.1 |
| 5,137,103 A | * | 8/1992 | Cartmell | 180/167 |
| 5,161,635 A | * | 11/1992 | Kiffe | 180/19.3 |
| 5,232,065 A | * | 8/1993 | Cotton | 180/11 |
| 5,375,673 A | * | 12/1994 | McCall et al. | 180/13 |
| 5,540,296 A | * | 7/1996 | Strothmann | 180/19.3 |
| 6,481,518 B1 | * | 11/2002 | Wu | 180/65.6 |

FOREIGN PATENT DOCUMENTS

| | | | | |
|---|---|---|---|---|
| JP | 5--301585 | * | 11/1993 | B62D/51/02 |
| JP | 5--301586 | * | 11/1993 | B62D/51/06 |

* cited by examiner

Primary Examiner—Avraham Lerner
(74) Attorney, Agent, or Firm—Dellett & Walters

(57) ABSTRACT

An electric one-bag golf cart that carries a single caddie bag for a player on a golf course is provided. The cart body, including a chassis part, a neck part and a steering device part, is formed as an integral hollow piece using the rotational molding method. The wheel system provided under the chassis consists of one front wheel and two rear wheels, with the front wheel being mounted pivotally on a suspension as a free wheel, while the rear wheels are driving wheels using a differential gear device driven by a motor. At the center of the handlebars, which are made of circular rods, a dial-type speed controller is located, and a brake lever is provided under the steering device, together with a lock mechanism.

3 Claims, 4 Drawing Sheets

ELECTRIC ONE-BAG GOLF CART

BACKGROUND OF THE INVENTION

This invention belongs to the field of technology relating to electric golf carts that carry a single caddie bag for a player over a golf course.

There are many conventional techniques for electric one-bag golf carts that carry a caddie bag for a player over a golf course, (for example, Japanese Patent Disclosure No. H9 (1997)-28847, Japanese Patent Disclosure No. H8 (1996)-229173, etc.).

The principal features common to these carts are that they are simply hand-pushed carts that have been provided electric power and they have old and unrefined designs consisting of a box-shaped chassis and handlebars made of circular metal rods. On the other hand, golf carts that have been given artistic elaboration with regard to the shape of the cart body and other parts are well known, as disclosed in Japanese Registered Design No. 1102885 issued to the present applicant.

But now golf is widely recognized as a social occasion, and with the number of female golf players increasing, golf has become a more sophisticated and fashionable pastime. Golf carts can no longer be old-fashioned, rough-styled machines that work only as carriers of golf bags. It is obvious that only fashionable golf carts that can match the beautiful of the fairways will give satisfaction to players. In that sense, the golf cart of the above mentioned Design Registration No. 1102885 perfectly meets these needs.

The object of the present invention is to provide a practical electric golf cart by embodying such design.

Were the general, conventional injection molding employed to form the cart body according to such design using synthetic resin, it would be impossible to mold the whole body as an single, integral piece. Based on the design facility of molds, it would seem inevitable that the body would have to be molded in at least three separate pieces. Even in such case, the molds would be complex and expensive. Moreover, very large injection molding machines would be required, resulting in high running costs. Further, various processes would be needed to attach the various parts to the molded pieces and to assemble them into a cart body, all in all resulting in a very expensive golf cart.

Additionally, some kinds of synthetic resin would present recycling and disposal problems. At the least, vinyl chloride and the like should not be used. Further, since the carts are used being exposed to strong sunlight, wind and rain, the issue of weatherproofing should also be taken into consideration.

Next, since golf players vary greatly in physical size, (especially height), for example, among children and grownups, men and women, and so on, electric golf carts, especially ones used for a single golf bag, should be constructed of a size that would allow them to be used easily by all kinds of players; preparing golf carts of various sizes would too much cost. The steering device on a conventional golf cart is usually designed simply as to be located at one level, and do not take into consideration the differences in physical sizes of players. Further, positional coordination between the speed controller for controlling the cart speed and the steering device is not adequate in conventional models. In addition, since the speed controller is generally of a knob type and its operational capability is rather poor, it is difficult to manipulate the controller while gripping the bars of the steering device.

The object of the present invention is to provide a golf cart for a single bag that has a cart body molded from the polyolefin family of plastics, in a single piece, using the rotational molding method. Such a golf cart is inexpensive, because it dispenses with the assembling process for the body, is easy to use, has no serious recycling or disposal problems, and is strong and weatherproof The next object of the present invention is to provide a golf cart for a single bag that can be used comfortably by various golf players, regardless of their physical size, and a golf cart the speed of which can be controlled easily while the steering device is being gripped by the golfer.

OUTLINE OF THE INVENTION

The electric one-bag golf cart according to the present invention is characterized in that the whole cart body, including the chassis, the neck part arising from the chassis and the steering device portion located at the top of the neck, is formed as an integral single hollow piece using the rotational molding method. The electric one-bag golf cart is further characterized in that the wheel system under the chassis consists of one front wheel and two rear wheels, with the front wheel mounted pivotally on a suspension, while the rear wheels are driving wheels using a differential gear device driven by a motor. The electric one-bag golf cart according to the present invention has a battery and a control board mounted in a battery chamber formed on the chassis together with a lid that can be freely opened and closed. The electric one-bag golf cart also has a speed control dial at the center of the steering device, made of circular rods, and a brake lever located under the steering device, together with a locking device.

In the electric one-bag golf cart according to the present invention, the steering device consists of lower grip parts, which extend backward on both sides and curved downward, and upper grip parts, which are curved upward from the corners where the rods are bent and are connected to the core portion of the steering device part where the speed controller is located.

The electric one-bag golf cart according to the present invention is further characterized in that the control board contains a micro-processing unit that checks the voltage level of the battery using digital signals. Signals from the speed controller are also converted into digital signals and sent to the micro-processing unit, where the cart speed is controlled by signals from the speed controller. The micro-processing unit sends driving signals to the motor driving circuit in order to make the calculated revolution rate of the wheels, traveling over the ups and downs of the golf course, approximately agree with the actual revolution rate as detected by a revolution sensor for the motor. The brake lever has a brake switch through which the driving signals to the motor are switched over to turn off the driving signals. The lock mechanism has a brake lock switch and, as the brake lever is locked, the micro-processing unit displays a locked status notice on the LED display device.

The electric one-bag golf cart according to the present invention has a body that is formed as an integral single hollow piece by utilizing the rotational molding method, which means that the structure of the molds is relatively simple and the cost to mold the body can be kept low. Further, since this molding method does not require particular pressure, no particularly large and high performance molding machines are needed, which means the facilities investment costs and the running costs can also be kept low, again contributing to low molding costs for the cart body. These features contribute to providing low-priced golf carts.

Since the cart body is formed as an integral single hollow piece, not only is it light-weight and uses less resin material, it is also almost free from assembling processes, does not give rise to the structural and strength problems due to seam lines, is easy to produce and can contribute to providing golf carts of excellent design, all of which will satisfies golfers.

Moreover, the feature of the rotational molding method has another advantage in that it provides adequate strength for the cart body because this method gives greater thickness at the corners of the golf cart body. Adoption of the polyolefin family of plastics, which can be easily disposed of or recycled, as the material for the cart body means that environment-friendly and yet colorful golf carts can be provided. Since this material is excellent in terms of being weatherproof, the golf cart does not greatly deteriorate in quality or discolor due to ultra-violet rays or rough weather.

The cart can be operated from a natural posture by golf players of various heights, with shorter players using the lower grip parts and taller players using the higher grip parts. Therefore, all players, regardless of differences in physical size, such as the differences among grown-ups and children, men and women, and so on, can use the cart comfortably. Further, the cart is user-friendly in that the speed controller and the brake lever can be manipulated by one hand while the steering device is being held.

The golf cart is controlled to run at the speed determined by the speed controller, regardless of the topography of the course, making the operation of the cart easy and comfortable for the player. When the brake of the cart is locked, the player can see the locked status visually on the display, and the player can concentrate on his or her play without having to worry about unexpected movements of the cart.

THE PREFERRED EMBODIMENTS OF THE INVENTION

Figure 1:
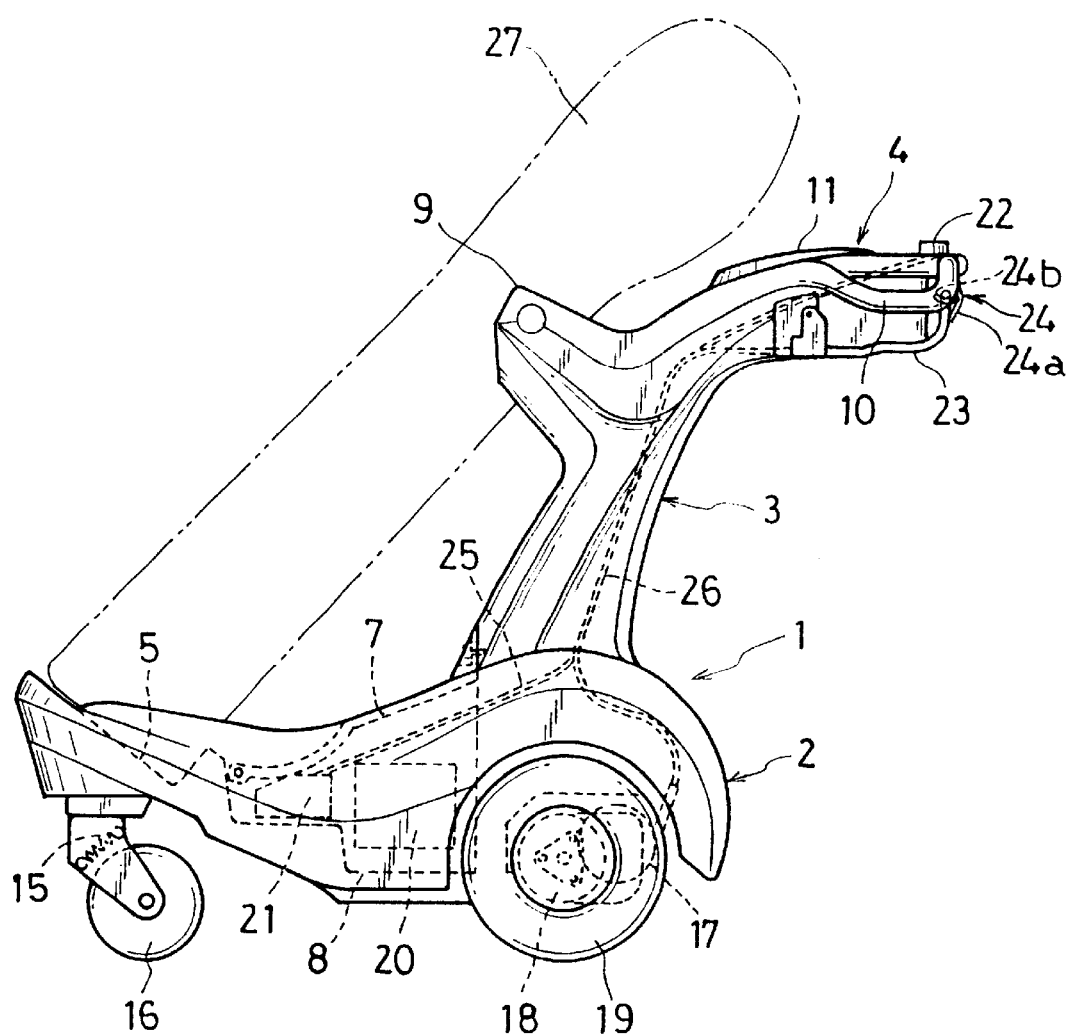
FIG. 1 shows a sketch of the structure of the electric one-bag golf cart according to the present invention.
Figure 2:
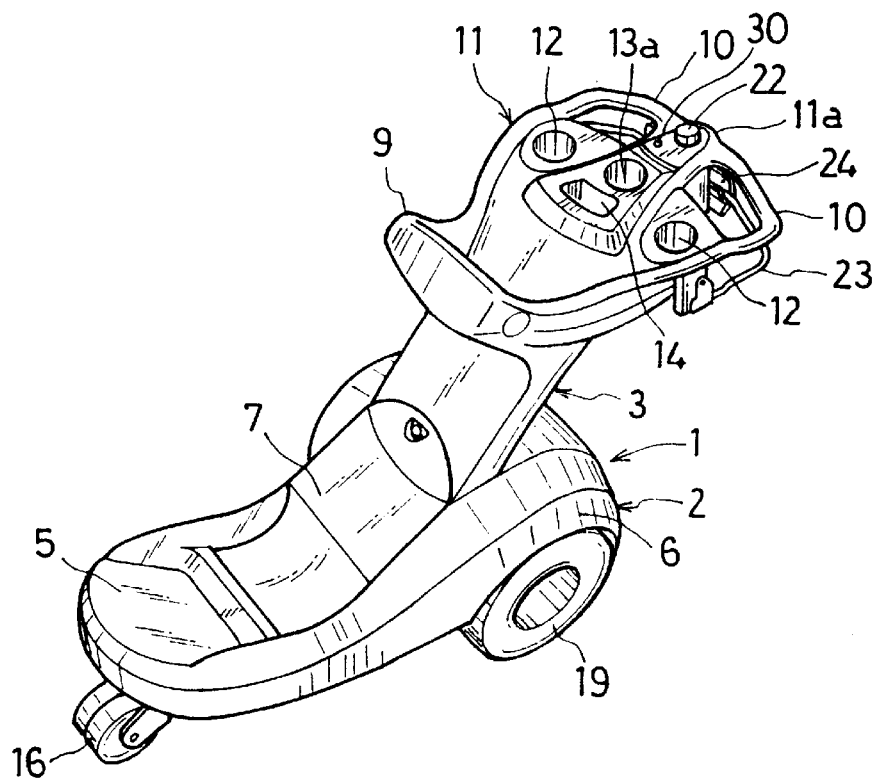
FIG. 2 is a diagonal front view of the electric one-bag golf cart according to the present invention.
Figure 3:
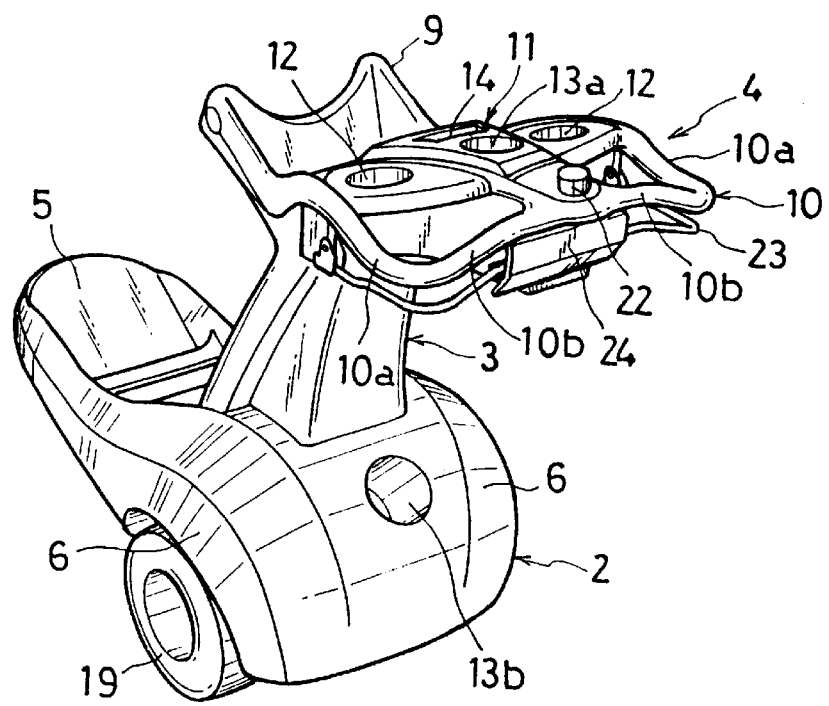
FIG. 3 is a diagonal rear view of the electric one-bag golf cart according to the present invention.
Figure 4:
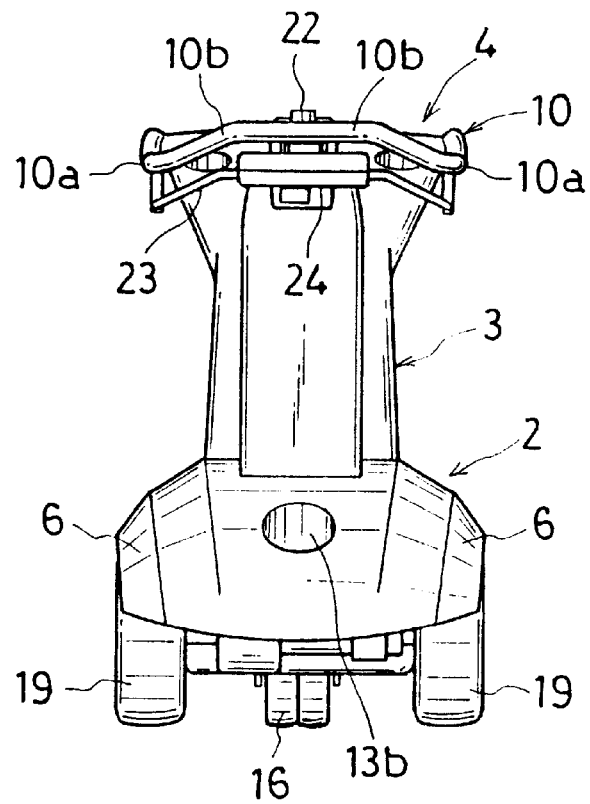
FIG. 4 is a back view of the electric one-bag golf cart according to the present invention.

The embodiment shown in FIGS. 1–6 is described below.

The cart body 1 includes a chassis part 2 having the approximate shape of a horizontal trapezoid, a neck part 3 arising from the chassis and a steering device part 4 provided at the top of the neck as a flat board, and is formed from the polyolefin family of plastics as an integral single hollow piece using the rotational molding method. More concretely, the chassis part 2 has, toward the front, a carrier part 5 to carry a caddie bag and, rising toward the rear side, has a round-shaped fender part 6 that extends horizontally to a width sufficient to hide the rear wheels when seen in a plan view. A battery chamber 8 is located between the carrier part 5 and the neck part 3, which has a lid 7 that can be opened and closed freely (see FIG. 1).

The neck part 3 has a smart shape and rises from the height of the chassis 2 declining gradually toward the rear and, tapering upward, reaches to the steering device part 4. The steering device part 4 formed as a flat board is located at the front end of the portion protruding forward from the neck and has handlebars 10 made of circular rods extending rearward from the neck and a central core portion 11 (FIG. 1). The handlebars 10 made of circular rods, have lower grip parts 10a which, extending on both sides backward from the core part 11, are curved downward, and upper grip parts 10b which are curved upward from the corners where the rods are bent in a perpendicular to the advancing direction of the front wheel, and are connected to the extended portion 11a of the core part 11, (the invention stated in claim 2; see FIGS. 3 and 4). The cart can be operated, therefore, from a natural posture by players of various heights, with shorter players using the lower grip parts 10a and taller players using the higher grip parts 10b. Hence, any player, regardless of difference in physical size can use the cart comfortably.

Several items are located at the core part 11 that are indispensable for enjoyable golf playing, such as drink holders 12, a hole to hold an umbrella 13a and a compartment 14 for small articles. The pole of an umbrella can be placed into the hole 13a and support hole 13b provided in the chassis part 2, (see FIG. 3).

Since the cart body 1, including the chassis part 2, the neck part 3 and the steering device part 4, is formed as an integral single hollow piece, it is light-weight and involves less resin material. Further, it is possible to produce a smart and aesthetically pleasing shape, with an elegant roundness. Since the polyolefin family of plastics can be molded with various colors, the golf carts will well match the beautiful golf courses on which they are used, to the satisfaction of the players.

Issues regarding the molding of the cart body 1 using the rotational molding method are described as follows. First, a mold corresponding to the whole cart body 1, consisting of the chassis part 2, (the lid 7 is molded separately), the neck part 3 and the steering device part 4, is filled with raw material from the polyolefin family of plastics, (in granulated form), and tightly sealed. The mold is heated in a furnace turned to $2\pi$ radian to melt the material homogeneously and to allow the molten material to stick to the inner surface of the mold. Then after cooling the mold and thereby solidifying the resin, the molded product, (the cart body 1 in one integral piece), is taken out. The mold itself is by design composed of several separate pieces to facilitate the process of taking out the molded product.

Since the cart body 1 of the electric one-bag golf cart according to the present invention is formed as an integral single hollow piece by utilizing the features of the rotational molding method, the structure of the molds is relatively simple and the cost to mold the body can be kept low. Further, since the molding method does not require particular pressure, no particularly large or high-performance molding machines are needed, which means the facilities investment costs and the running costs can be kept low, again contributing to low molding costs for the cart body 1. These features contribute to providing low-priced golf carts.

Of course because the cart body 1 is formed as an integral single hollow piece, it is almost free from assembling processes, does not involve structural and strength problems of seam lines, and is easy to produce. Moreover, the rotational molding method has another advantage in that it provides adequate strength for the cart body 1 because the method gives greater thickness at the corners of the cart body 1.

The use of the polyolefin family of plastics, which can be easily disposed of or recycled, for the cart body material means that environment-friendly and yet colorful golf carts can be provided. Since this material is excellent in terms of being weatherproof, the golf cart does not much deteriorate in quality or discolor due to ultra-violet rays or rough weather.

The electric one-bag golf cart according to the present invention has on the lower surface of the fore portion of the chassis 2 of the cart body 1 a front wheel 16 that is mounted pivotally as a free wheel with a suspension mechanism 15. The running of the cart is, therefore, smooth even on golf courses of uneven surface. On the lower surface of the rear portion of the chassis 2 of the cart body 1 a pair of rear wheels 19, 19 are mounted as driving wheels using a differential gear device 18 driven by a motor 17, providing smooth operation of the cart.

A battery 20 and a control board 21 are mounted in the battery chamber 8. By opening and closing the lid 7, the battery 20 can easily be replacement with a new one. As the lid 7 is sloped upward toward the rear, rainwater does not enter the battery chamber 8, and there is little fear of malfunction of the battery 20 or the control board 21.

Figure 5:
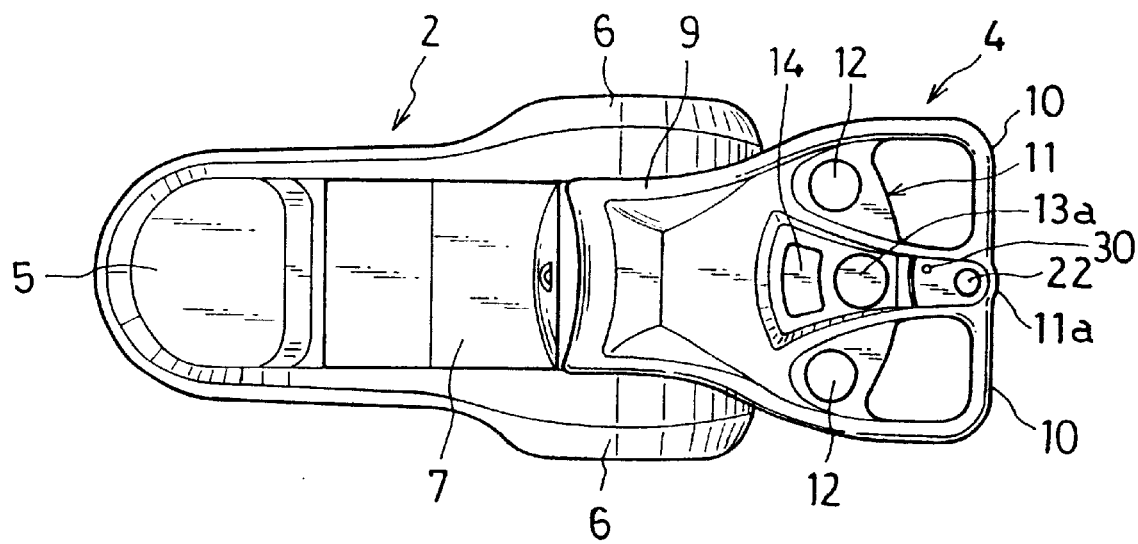
FIG. 5 is a plan view of the electric one-bag golf cart according to the present invention.

A dial-type speed controller 22 is located at the center of the core extension part 11a of the steering device part 4, near the junction portion of the upper grip parts 10b, (see FIG. 5). Owing to this arrangement, the player can turn the speed controller 22 to control the speed of the cart, while his or her hands are holding the grip parts 10b, making the cart user friendly. A brake lever 23 is located under the handlebars 10, together with a lock mechanism 24, in such a manner as to form approximately the same shape as the handlebars 10 when seen in a plan view. The lock mechanism 24 consists of a plate 24a bent inwardly and a hook 24b, attached near the bent part of the plate 24a and the upper end of the plate 24a, is connected to the lower rear end of the core extension part 11a, (see FIGS. 1 and 2), in such a way as to be able to rotate. To stop the golf cart, therefore, the player pulls up the brake lever 23 and, turning the plate 24a inwardly, hangs the brake lever 23 on the hook 24b of the plate 23a. The brake lever 23 is thus fixed, and the braked status is maintained.

The electric wires 25 extending from the speed controller 22 to the control board 21, and the brake wires 26 of the brake lever 23, are guided within the neck part 3 utilizing the fact that the cart body 1 is a hollow integral piece, and are not exposed to view.

When the player uses the golf cart described above, the player puts the caddie bag 27 on the carrier part 5, then rests the bag against the bag support part 9 and fastens the bag 27 with a belt, (not shown).

Figure 6:
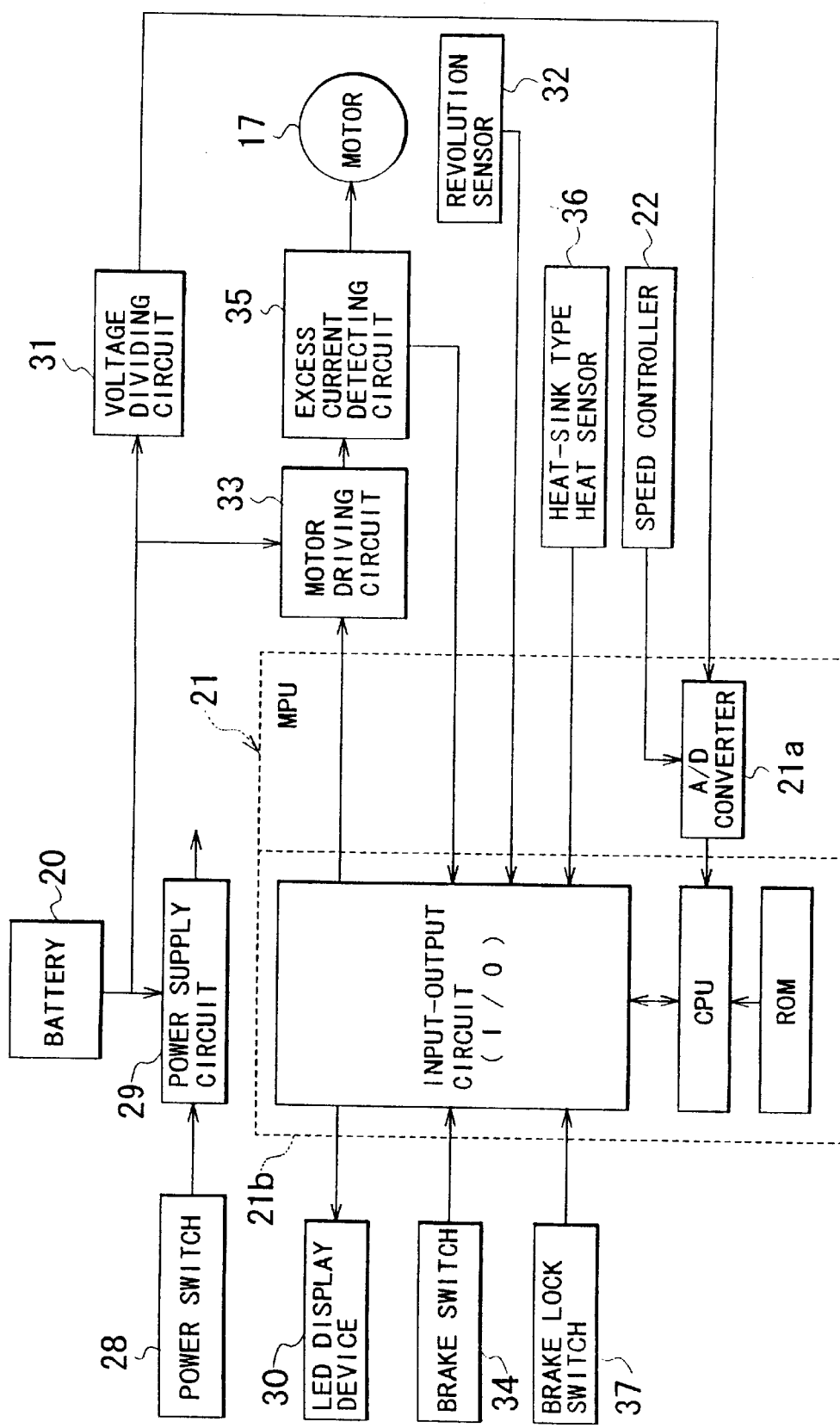
FIG. 6 is a diagram of the electric control circuit of the electric one-bag golf cart according to the present invention.

The structure of the electric-control circuit of the golf cart according to the present invention is as shown in the diagram of FIG. 6. As the player turns on the power switch 28, necessary electric current is supplied to the power supply circuit 29 and the control board or the micro-processing unit 21, (hereinafter abridged as "MPU" and designated by the same symbol 21 as the control board), is started. The MPU 21 includes an analog-digital (A/D) converter 21a and consists of, in addition to the A/D converter, a main part MPU 21b, which comprises an input-output (I/O) circuit, a CPU, a ROM and so on.

The player, after checking that the voltage level of the battery 20 is full by looking at the LED display device 30, can start the golf cart by releasing the brake lever 23 from the lock mechanism 24. The voltage of the battery 20 is divided by a voltage dividing circuit 31 and converted by the A/D converter 21a into digital signals, which are sent to the MPU main body 21b. The MPU main body 21b checks the voltage level of the battery 20 and shows the result on the LED status display device 30, (green light for amply charged status and red light for deficiently charged status, for example). The player, therefore, can always check the voltage level and can prevent unexpected stopping of the cart due to deficient charge.

The player adjusts the cart speed with the speed controller 22 to his walking pace. The signals from the speed controller 22 are converted into digital signals and sent to the MPU main body 21b. In the MPU main body 21b, the revolution rate is programmed to control the speed in response to the signals from the speed controller 22 and to the ups and downs of the golf course, and the MPU main body 21b sends such driving signals to the motor driving circuit 33 so as to make the calculated revolution rate approximately agree with the actual revolution rate detected by a revolution sensor 32 of the motor. The cart, therefore, runs at a constant speed regardless of the topography of the golf course, which provides the player with more comfortable play.

If, for example, the golf cart enters a decline and the revolution rate of the motor 17 increases, which the revolution sensor 32 detects, or if the player grips the brake lever 23 and the brake switch 34 of the brake lever 23 is turned on, these signals are sent to the MPU main body 21b and the MPU main body 21b changes the driving signals to the motor driving circuit 33 in such a way as to the reverse the driving signals and thereby decelerate the golf cart. Conversely, if the golf cart enters an incline and the revolution rate of the motor 17 decreases, which the revolution sensor 32 detects, such signals are sent to the MPU main body 21b and the MPU main body 21b increases the driving force of the motor 17 and thereby accelerates the golf cart. Even when the golf cart is on a steep decline, an excess current detecting circuit 35 is located between the motor driving circuit 33 and the motor 17 to prevent the motor 17 from burning out. If excess current in the motor 17 is detected, the signal is sent to the MPU main body 21b, which cuts off the driving signals to the motor driving circuit 33 and displays an emergency message on the LED status display device 30.

Further, a heat-sink type heat sensor 36 is located in the motor driving circuit 33, and if such heat sensor 36 detects an excess heat in the motor driving circuit 33, in the same manner as said above, the MPU main body 21b cuts off the driving signals to the motor driving circuit 33 and displays an emergency message on the LED status display device 30. Thus, trouble due to overheating of the motor driving circuit 33 can be prevented.

As the player approaches the spot where his ball has dropped, he fixes the brake lever 23 to the lock mechanism 24. A brake lock switch 37 is provided in the lock mechanism 24, and as the brake lever 23 is fixed, a signal is sent to the MPU main body 21b. Then the MPU main body 21b cuts off the driving signals to the motor driving circuit 33 and displays a message on the LED status display device 30 saying the cart is in the locked condition, (the invention stated in claim 3). The player can, therefore, visually confirm that the brake is in the locked position and is not bothered by the concern that the cart may start moving during play.

When the golf play is finished, the player fixes the brake lever 23 to the lock mechanism 24 and switches off the power. This guarantees the check of the brake locking for the safety of the next player to use the cart.

What is claimed is:

1. An electric one-bag golf cart in which a cart body, including a chassis part, a neck part rising from said chassis part and a steering device part at the top of said neck part, is formed as an integral hollow piece by a rotational molding method, characterized in that a wheel system provided under said chassis consists of one front wheel and two rear wheels, said front wheel being mounted pivotally on a suspension as a free wheel, while said rear wheels are driving wheels having a differential gear device driven by a motor, that a battery and a control board are mounted in a battery chamber formed on said chassis together with a lid that can be opened and closed freely, and that a speed control dial is provided at a center of said steering device part made of circular rods and a brake lever is provided under said steering device part together with a lock mechanism.

2. The electric one-bag golf cart stated in claim 1 characterized in that handlebars made of circular rods consist of lower grip parts, which, extending on both sides thereof backward, are curved downward and upper grip parts, which are curved upward from corners where said circular rods are bent to a direction perpendicular to an advancing direction of said front wheel and are connected to a core portion of said steering device part where said speed controller is provided.

3. The electric one-bag golf cart stated in claim 1 characterized in that said control board comprises a micro-processing unit and determines a voltage level of said battery by digital signals converted therefrom, that said digital signals from said speed controller are also converted into digital signals and are sent to said micro-processing unit, which has a program incorporated therein to determine a revolution rate to control cart speed in response to said digital signals from said speed controller and to unevenness of a surface of a golf course, and which sends said driving signals to said motor driving circuit so as to make said calculated revolution rate approximately agree with an actual revolution rate detected by a revolution sensor for said motor, that said brake lever has a brake switch through which said driving signals to said motor driving circuit are switched over to reverse driving signals or cut off, and that in said lock mechanism is provided a brake lock switch and if said brake lever is fixed, said micro-processing unit outputs a locked status message on said LED display device.

* * * * *